June 8, 1943.  F. M. BUTTERWORTH  2,321,184
COMBINED BUSINESS CARD AND LABEL
Filed May 2, 1942
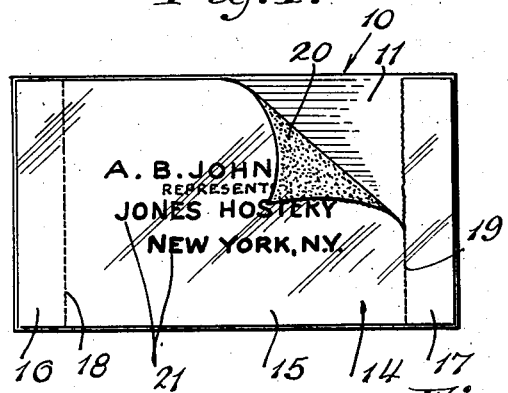
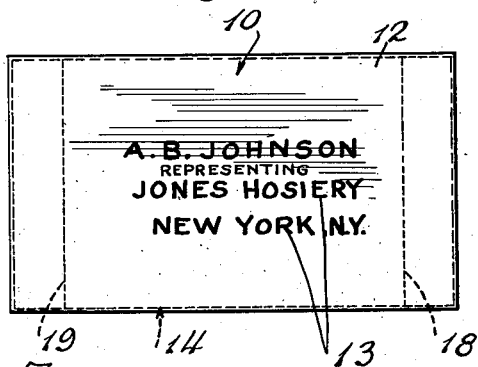
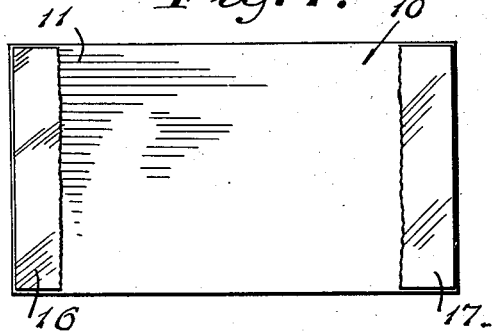
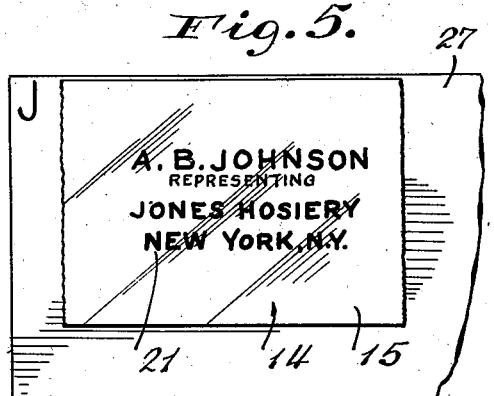
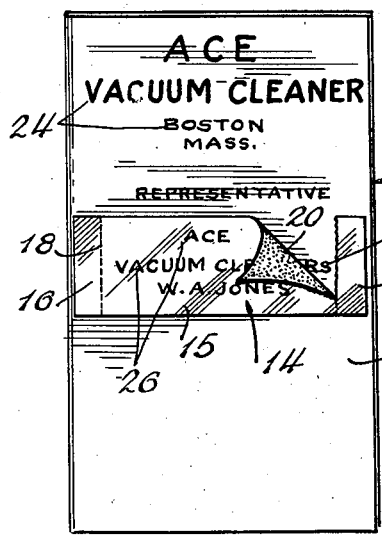
INVENTOR.
FRANCES MILLER BUTTERWORTH
BY
Richards & Geier
ATTORNEYS Patented June 8, 1943

2,321,184

UNITED STATES PATENT OFFICE 2,321,184

COMBINED BUSINESS CARD AND LABEL

Frances Miller Butterworth, Hasbrouck Heights, N. J.

Application May 2, 1942, Serial No. 441,448

1 Claim. (Cl. 283—21)

This invention relates to pamphlets, business calling cards and similar articles which are usually provided with printed matter and are used to advertise or describe a person, a commercial or manufacturing establishment, an institution, a product, or a service.

Salesmen calling upon or writing to a prospective customer to advertise or describe a product usually leave with the customer some pamphlet, card or other printed matter which, in many instances, is discarded shortly after it is delivered, for the reason that it is inconvenient for the prospective customer to preserve this printed matter. Business cards and calling cards, are often discarded for the same reason, thereby destroying possible future contact between salesmen and prospective customers.

It is also customary for manufacturers to supply with purchased products, instructions for their proper application and care. This printed matter is most important to the complete satisfaction of the customer, and therefore, the manufacturer—but, due to the fact that often it is not presented in a form permitting of easy preservation, it is misplaced or discarded.

It is apparent that, because the accumulation of the described printed matter in its entirety takes up too much space as well as reading time, much valuable information is wasted.

An object of the present invention is to aid producers, or manufacturers, in the fulfillment of the purpose of printed matter of this type by enabling the receiver of such printed matter to affix a vital part of it to personal records for future reference, and to discard—after first reading—the mass matter the accumulation of which is a nuisance.

Another object is to aid the consumer by providing a pamphlet, business card, visiting card, or salesman's card which is so constructed that a part of it can be easily removed and preserved by the person receiving the same.

Other objects of the present invention will become apparent in the course of the following specification.

The present invention is based to an extent upon the observation that many businesses and households desire and endeavor to keep private records and note-books wherein useful information, such as certain phone numbers and addresses, clippings, consumer information, recipes, and the like can be entered for efficient future reference.

On the other hand, pamphlets and other advertising material, business cards, calling cards, and the like, are often discarded, since they are too bulky and cannot be conveniently preserved. The present invention would make desirable record-keeping much easier, and more concise.

The present invention involves the use of a card, pamphlet or the like which comprises a label, having a central portion which is provided with printed matter describing a firm, a visitor, a product, or service, as well as two side portions which are easily separable from the main portion.

The two side portions are coated with an adhesive and are utilized to connect the label firmly with the card or pamphlet. The central portion, on the other hand, is not connected with the card or pamphlet even though it is also provided with an adhesive.

The label when carried upon a card or pamphlet constitutes an integral part thereof, so that the card or pamphlet presents the usual appearance when delivered to the host or customer. However, the latter is afforded the opportunity of easily detaching the central portion of the label from the card or pamphlet, and affixing such central portion to her, or his, notebook, card system, or the like, before the card or pamphlet is discarded.

The invention will appear more clearly from the following detailed description, when taken in connection with the accompanying drawing showing, by way of example, preferred embodiments of the inventive idea.

In the drawing:

Figure 1 is a front view of a card made in accordance with the principles of the present invention.

Figure 2 is a rear view of the card.

Figure 3 is a section through the card.

Figure 4 shows the card with the central portion removed.

Figure 5 illustrates a method of preserving the central portion of the calling card.

Figure 6 illustrates a pamphlet made in accordance with the principles of the present invention.

Figures 1 to 5 of the drawing show a calling card or business card having a substantially rectangular base 10 which may be made of cardboard, stiff paper or any other suitable material, and which has a front surface 11 and a rear surface 12. The rear surface 12 may be provided with printed matter 13 describing a caller, his firm, his business, his product, and so forth.

The front surface 11 of the base 10 carries a label 14, the size of which may be substantially the same as that of the base 10.

The label 14 includes a central portion 15 and two side portions 16 and 17 which are located on opposite sides of the central portion 15. Lines of perforation or indentations 18 and 19 may separate the central portion 15 from the side portions 16 and 17. The entire rear surface of the label 14, including the central portion 15, as well as the side portions 16 and 17, is coated by a layer of adhesive 20.

The central portion 15 is provided with suitable printed matter 21 which may be the same as the printed matter 13 provided upon the rear surface 12.

The side portions 16 and 17 are firmly connected or glued to the base 10. On the other hand, the central portion 15 of the label 14 is not glued to the base 10, as is diagrammatically indicated in Figure 3.

It is apparent, that the described article has two functions, namely, those of a card and of a label. When the card shown in the Figures 1, 2 and 3 is presented to a person it serves solely as a calling or business card. On the other hand, the person receiving the card may utilize the portion 15 thereof as a label which may be affixed in a note-book, or card system of the user. For that purpose, the user removes the central portion 15, said central portion being easily separable from the side portions 16 and 17 along the lines 18 and 19, as indicated in Figure 1.

Figure 4 illustrates the front of the card after the central portion 15 has been removed. The card may be discarded at that time, or its use may be continued due to the provision of the printed matter 13 upon the rear surface 12 of the base 10.

The separated central portion 15, the rear surface of which is coated with an adhesive 20, may be conveniently used as a label which can be affixed in a note-book or upon a card 27, shown in Figure 5.

Thus the described article serves as a visiting or business card which is normally discarded, and also as a label which may be conveniently preserved to constitute a permanent record.

Figure 6 of the drawing illustrates a page 22 of a pamphlet or booklet 23 which may consist of several pages. The booklet 23 is provided with a large amount of printed matter 24.

According to the present invention, the pamphlet 23 carries the label 14 which enables the receiver to record permanently the most important information contained in the pamphlet. As in the previously described construction, the label 14 includes a removable central portion 15, as well as side portions 16 and 17 which connect the label 14 to the page 22 of the pamphlet. The removable portion 15 may be conveniently affixed in a note-book or upon a card constituting a part of a permanent card system.

In this arrangement, that part of the pamphlet surface 22 which is covered by the central portion 15 is also provided with information 25 which may be the same as the printed matter 26 provided upon the central portion 15. The removal of the central portion 15 thus exposes the information 25, so that the value or use of the pamphlet is in no way affected by the removal of the central portion. On the other hand, the central portion 15, the printed matter 26 of which may repeat in a concise form the message contained in the pamphlet, can be conveniently used as a permanent record.

Obviously, the arrangement illustrated in Figure 6, may be conveniently used in conjunction with the calling or business card illustrated in Figures 1, 2 and 3. In general, many other variations and modifications may be made within the scope of the present invention. All of such variations and modifications are to be included within the scope of the present invention.

What is claimed is:

In an article of the type described, a base, and a sheet having a central portion and two side portions situated on two sides of said central portion, said central portion having printed matter thereon and being removable from said side portions; and a layer of adhesive carried by the rear surfaces of said central portion and said side portions, the adhesive upon said side portions connecting said sheet with said base, whereby said sheet is mounted upon a surface of said base, while the adhesive upon said central portion is devoid of operative engagement with the underlying surface of said base, said sheet being substantially coextensive with said base, whereby said sheet and said base form a combined business or service card and label.

FRANCES MILLER BUTTERWORTH.